United States Patent Office 2,856,430
Patented Oct. 14, 1958

2,856,430

METHOD FOR PREPARING MONOHALO-ACETONES

Edward U. Elam, Kingsport, Tenn., assignor to Eastman Kodak Company, Rochester, N. Y., a corporation of New Jersey No Drawing. Application August 28, 1957
Serial No. 680,670

6 Claims. (Cl. 260—597)

This invention concerns the preparation of monohaloacetones. A preferred embodiment of the invention concerns the preparation of monochloroacetone.

Monohaloacetones are useful commercial chemicals. For example, monochloroacetone, which is an extremely reactive and versatile chemical intermediate, is commonly used in the preparation of numerous useful chemical compounds including heterocyclic compounds. Also, monochloroacetone is used in the refining of mineral oils as disclosed in Ferris, U. S. 2,062,872, and in photosensitizing cyanine dyes as disclosed in British Patent 405,028.

The commonly employed commercial method for preparing monochloroacetone is to directly chlorinate acetone. However, this method is difficult to control and it tends to yield considerable amounts of polychlorinated acetones, some of which are difficult to separate from the desired monochloroacetone. Similar problems accompany the preparation and separation of monobromoacetone.

It is an object of this invention to provide a new method for preparing monohaloacetones.

It is another object of this invention to prepare monochloroacetone by a novel process.

It is a further object of this invention to provide a novel process for preparing monohaloacetones from readily available starting materials.

It is a still further object of this invention to provide an improved process for preparing monohaloacetones with a minimum of polyhaloacetones being formed in the course thereof.

It is likewise an object of this invention to provide an improved continuous process that is especially adapted for preparing monohaloacetones on a large scale.

These and other objects of the invention are accomplished by reacting allene with a hypohalous acid in the manner described hereinbelow. The present process can be represented by the following equation:

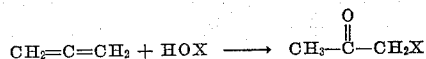

wherein X is a halogen.

Allene is a gaseous by-product resulting from the manufacture of acetic anhydride and is available in sizable quantities at relatively low cost. Allene is also commonly called "propadiene" and "dimethylenemethane."

The method used for preparing the hypohalous acid utilized in the present process can be widely varied, and any method can be utilized. However, the preferred method for preparing the hypohalous acid used in the present process is to simply associate the halogen with water, this method being particularly effective for preparing hypochlorous acid and hypobromous acid. Thus, the hypohalous acid can be formed in situ in the present process by employing an aqueous reaction medium and by merely adding the halogen thereto. Hypochlorous acid is preferably employed, although hypobromous acid and hypoiodous acid can also be utilized.

A minor proportionate amount of metal salt can be used to accelerate or catalyze the present reaction, although the present reaction can be effected in the absence of such catalyst materials. Typical of such catalyst materials are cuprous chloride, cuprous bromide, aluminum chloride, ferric chloride, and the like. The amount of catalyst material can be broadly varied although at least about .01% based on the weight of the reaction mixture is usually employed.

A wide range of temperature conditions can be employed. The reaction temperature can vary from the freezing point of the reaction mixture, which is usually about 0° C., or in some instances as low as —10° C., to about 80° C. or even higher. Preferred reaction temperatures are in the range of 0° C. to 20° C. As the present reaction is exothermic, external cooling is often times desirably employed to maintain the temperature of the reaction mixture within the preferred temperature range described above. The temperature of the reaction mixture can also be regulated by carefully controlling the addition of reactants to the reactor.

The instant reaction is preferably and conveniently effected under atmospheric pressure, although higher pressures or even sub-atmospheric pressures can be utilized.

In carrying out the present process, an aqueous reaction medium is employed. To minimize the formation of polyhaloacetones, the aqueous reaction medium is employed in sufficient volume to dissolve the monohaloacetone as it is formed in the course of the present reaction, a separate liquid phase of monohaloacetone in the reaction medium being avoided. More generally, sufficient aqueous reaction medium is employed so that the monohaloacetone reaction product comprises less than about 10% and preferably less than 5%, by volume of the aqueous reaction medium.

The amounts of allene and hypohalous acid or halogen in the aqueous reaction medium are also carefully controlled to produce maximum amounts of monohaloacetone and minimum amounts of polyhaloacetones. A molar excess of allene is employed in the reaction mixture to serve this end. In short, the amount of allene and hypohalous acid or the halogen used to form the hypohalous acid in the aqueous reaction mixture are proportioned so that the molar ratio of allene/halogen material exceeds one. Excess or unreacted portions of the normally gaseous allene can be readily removed from the reaction mixture.

The present process can be effected batch-wise or continuously. In a typical batch operation for preparing monobromoacetone, for example, bromine and allene are combined in a reaction vessel containing water, the bromine reacting with the water to form hypobromous acid and the resulting hypobromous acid reacts with the allene to form monobromoacetone. In a typical continuous process for preparing monochloroacetone, for example, water is continuously introduced into the top portion of a reaction column and streams of allene and chlorine are continuously introduced into lower portions of the column so as to establish a stream of gas countercurrent to the flow of water through the column. The allene is preferably introduced into the column at a point lower in the column than the chlorine, although both the allene and the chlorine can be suitably introduced into the same portion of the column. The chlorine continuously reacts with the water to form hypochlorous acid, and the hypochlorous acid continuously reacts with the allene to form monochloroacetone. The monochloroacetone reaction product dissolves in the water and is continuously removed from the bottom portion of the column with excess or unreacted portions of the water passing through the column. Excess or unreacted allene is continuously removed from the top portion of the column.

The column desirably contains a tortuous path for liquids therethrough to more effectively allow the reactants to associate and react, the column preferably containing packing such as is used in fractional distillation columns. The monohaloacetone can thereafter be readily separated from such reaction mixtures by conventional separation methods including solvent extraction, distillation, adsorption, or the like.

The invention is illustrated by the following examples of preferred embodiments thereof.

*Example 1*

A solution of 1 gram of cuprous chloride in 1 liter of water was placed in a two-liter three-necked reaction flask which was fitted with a sealed stirrer, a thermometer, a Dry Ice-cooled condenser and gas inlet tubes for allene and chlorine. The solution in the reaction flask was cooled in an ice bath to 10° C. Allene was passed into the reaction flask until gentle reflux was noted in the condenser. Thereafter, chlorine was fed into the reactor. The respective feed rates of allene and of chlorine were adjusted so that a gentle reflux was noted in the condenser. The respective feed rates of allene and of chlorine were adjusted so that a gentle reflux of allene was maintained in the condenser, this assuring an excess of allene in the reaction flask. Both the allene feed and the chlorine feed were regulated so that the reaction temperature was maintained in the range of about 5° to 10° C. After one hour, the allene and chlorine feeds were shut down and the reaction stopped. Twenty-four grams of the allene were absorbed in the reaction mixture. The resulting reaction mixture was thereafter steam distilled to give a 20.5 gram organic layer of monochloroacetone. The resulting organic layer was analyzed and found to contain 35.50% by weight of chlorine which is equivalent to a monochloroacetone content of about 92%.

*Example 2*

The reaction procedure of Example 1 was repeated except that the reaction temperature was maintained in the range of about 15° to 20° C. and the reaction was allowed to continue for 1.5 hours. The reaction product was extracted with diethyl ether and the resulting extract washed first with water and then with a dilute sodium carbonate solution. The resulting washed ether extract was distilled in a Vigreux column to give a monochloroacetone fraction boiling from 40° to 70° C. at 50 mm. of mercury which was strongly lachrymatory. A 2,4-dinitrophenylhydrazone derivative was made of the resulting distilled monochloroacetone which melted at 123° to 125° C. The melting point of the derivative was not changed after two recrystallizations.

*Example 3*

The reaction procedure of Example 1 was repeated with a 500 ml. three-necked reaction flask fitted as described in Example 1 and containing 200 ml. of water. However, no cuprous chloride catalyst was employed. The resulting reaction product was then extracted, washed and distilled as described in Example 2. The 2,4-dinitrophenylhydrazone derivative was made of the resulting separated monochloroacetone which melted at 124 to 125° C. Hence, allene reacts with such hypohalous acids as hypochlorous acid to form monochloroacetone in the absence of a catalyst.

*Example 4*

Monochloroacetone was prepared by a continuous process in a reaction column. A glass column approximately three feet long and 1.5 inches in diameter was packed with stainless steel "Penn State" distillation column packing. The top of the column was fitted with an inlet for feeding water to the column and a vapor outlet which led to a Dry Ice trap. The bottom of the column was fitted with an inlet for feeding allene to the column and a flask for receiving the reaction product and water reaction medium from the column. The center of the column was fitted with an inlet for feeding chlorine to the column. A 0.1% aqueous solution of cuprous chloride was continuously introduced drop-wise into the top of the column, a stream of chlorine was continuously introduced into the bottom of the column. The feed rates of allene and chlorine were correlated so that a molar excess of allene over the chlorine was introduced into the column and in such amounts that the temperature of the reactants in the column was in the range of about 15° to 20° C. Sufficient water was allowed to flow through the column so that the monochloroacetone reaction product dissolved therein on being formed. Unreacted or excess allene was continuously removed from the top of the column and the aqueous reaction product containing dissolved therein the monochloroacetone reaction product was continuously removed from the bottom of the column and collected. The reaction product was identified as monochloroacetone by forming a 2,4-dinitrophenylhydrazone derivative thereof which melted at 124° to 125° C. A mixture of this derivative with the acetone 2,4-dinitrophenylhydrazone derivative (M. P. 126°–127° C.) began to melt at a temperature below 115° C., indicating that the derivative prepared from the product of the described continuous process was that of monochloroacetone and not of acetone.

The present process conveniently utilizes allene, a readily available by-product of the manufacture of acetic anhydride to prepare the commercially useful monohaloacetones. Monohaloacetones, such as monochloroacetone, are difficult to prepare by conventional methods because of the formation of polychloroacetones in the course of the preparation thereof which are often times difficult to separate from the desired monochloroacetone. However, in accordance with the present process, the preparation of monohaloacetones can be readily effected with a minimum of polyhaloacetones being formed in the reaction mixture. Further, the present process is relatively simple to effect and is readily adaptable to commercially desirable, large-scale continuous operations. Accordingly, the instant invention provides a particularly desirable method for preparing monohaloacetones.

Although the invention has been described in considerable detail with reference to certain preferred embodiments thereof, it will be understood that variations and modifications can be effected within the spirit and scope of the invention as described hereinabove and as defined in the appended claims.

I claim:

1. The process for preparing monohaloacetones which comprises reacting a hypohalous acid with a molar excess of allene in an aqueous reaction medium, said aqueous reaction medium being of sufficient volume to dissolve the resulting monohaloacetone reaction product and to form a substantially single phase solution.

2. The process for preparing monochloroacetone which comprises reacting hypochlorous acid with a molar excess of allene in an aqueous reaction medium, said aqueous reaction medium being of sufficient volume to dissolve the resulting monohaloacetone reaction product and to form a substantially single phase solution.

3. The process for preparing monochloroacetone which comprises introducing allene and chlorine into an aqueous reaction medium at a temperature of 0° to 20° C., said allene and chlorine being proportioned so that the molar ratio of allene/chlorine exceeds one, forming hypochlorous acid in said reaction medium, and thereafter reacting the resulting hypochlorous acid with said allene to form monochloroacetone, said aqueous reaction medium being of sufficient volume to dissolve the resulting monochloroacetone reaction product and to form a substantially single phase solution.

4. The process according to claim 3 wherein the said reaction of hypochlorous acid and allene is catalyzed with a minor proportionate amount of cuprous chloride.

5. A continuous process for preparing monohaloacetones which comprises continuously introducing water into the top portion of an enclosed reaction zone and establishing a flow of water through said reaction zone, continuously introducing a gaseous stream of allene into the bottom portion of said reaction zone countercurrent to the flow of water through said reaction zone, continuously introducing into said reaction zone a halogen capable of forming a hypohalous acid with said water, continuously reacting said halogen with said water to form a hypohalous acid, continuously reacting the resulting hypohalous acid with said allene to form a monohaloacetone, continuously removing resulting monohaloacetone from the bottom portion of said reaction zone with resulting unreacted portions of said water, and continuously removing unreacted allene from the top portion of said reaction zone, the amount of said allene, said halogen and said water introduced into said reaction zone being correlated so that sufficient water is present to dissolve the said formed monohaloacetone reaction product and to form a substantially single phase solution and so that the molar ratio of allene/halogen exceeds one.

6. A continuous process for preparing monochloroacetone which comprises continuously introducing water into the top portion of an enclosed reaction zone maintained at a temperature of 0° to 20° C. and establishing a flow of water through said reaction zone, continuously introducing gaseous streams of allene and chlorine into said reaction zone countercurrent to the flow of water through said reaction zone, said chlorine being introduced into said reaction zone at a point higher in said reaction zone than said allene, continuously reacting said chlorine with said water to form hypochlorous acid, continuously reacting the resulting hypochlorous acid with said allene to form monochloroacetone, continuously removing resulting monochloroacetone from the bottom portion of said reaction zone with resulting unreacted portions of said water, and continuously removing unreacted allene from the top portion of said reaction zone, the amount of said allene, said chlorine and said water introduced into said reaction zone being correlated so that sufficient water is present to dissolve the said formed monochloroacetone reaction product and to form a substantially single phase solution and so that the molar ratio of allene/chlorine exceeds one.

No references cited.